(12) United States Patent
Cergnul (10) Patent No.: US 10,562,462 B1
(45) Date of Patent: Feb. 18, 2020

(54) UTILITY RACK SYSTEM

(71) Applicant: Tony John Cergnul, West Branch, MI (US)

(72) Inventor: Tony John Cergnul, West Branch, MI (US)

( * ) Notice: Subject to any disclaimer, the term of this patent is extended or adjusted under 35 U.S.C. 154(b) by 23 days.

(21) Appl. No.: 15/945,518

(22) Filed: Apr. 4, 2018

Related U.S. Application Data (63) Continuation of application No. 14/031,471, filed on Sep. 19, 2013, now Pat. No. 9,950,676.

(51) Int. Cl.
*B60R 9/06* (2006.01)

(52) U.S. Cl.
CPC ...................... *B60R 9/06* (2013.01)

(58) Field of Classification Search
CPC ........... B60R 9/06; B60R 9/042; B60R 9/045; B60R 2011/0085
USPC ....... 224/462, 492, 282, 504–506, 524, 548, 224/553, 564–565, 519
See application file for complete search history.

(56) References Cited

U.S. PATENT DOCUMENTS

| | | |
|---|---|---|
| 3,658,201 A | 4/1972 | Williams |
| 4,400,129 A | 8/1983 | Eisenberg et al. |
| 4,406,574 A | 9/1983 | Riley |
| 4,429,818 A | 2/1984 | Patterson et al. |
| 4,744,590 A * | 5/1988 | Chesney ................... B60R 9/06 224/520 |
| 5,040,710 A | 8/1991 | Lee |
| 5,174,622 A | 12/1992 | Gotta |
| 5,460,307 A | 10/1995 | Stevenson |
| 5,492,258 A | 2/1996 | Brunner |
| 5,775,560 A * | 7/1998 | Zahn ......................... B60R 9/06 224/485 |
| 5,788,311 A | 8/1998 | Tibbals |
| 6,129,371 A * | 10/2000 | Powell ..................... B60R 9/06 224/502 |
| 6,253,981 B1 * | 7/2001 | McLemore ............... B60R 9/06 224/524 |
| 6,457,618 B1 | 10/2002 | Hancock et al. |
| 6,502,730 B2 | 1/2003 | Johnson |
| 6,712,248 B2 * | 3/2004 | Mitchell ................... B60R 9/06 224/498 |
| 6,830,423 B1 | 12/2004 | Williams et al. |
| 6,846,017 B2 | 4/2005 | Martin |
| 6,948,732 B2 * | 9/2005 | Amacker .................. B60R 9/06 280/415.1 |
| 7,111,765 B1 * | 9/2006 | Blakley .................... B60R 9/06 224/506 |

(Continued)

*Primary Examiner* — Nathan J Newhouse
*Assistant Examiner* — Phillip D Schmidt
(74) *Attorney, Agent, or Firm* — Larson Newman, LLP (57) ABSTRACT

A storage system includes a utility rack having a base frame with a plurality of cross members extending across the base frame and an accessory. The accessory includes at least one attachment device for attaching to at least one of the cross members. The attachment device includes a cross member retainer configured to partially retain a cross member, a hinged brace configured to move between an open position rotated away from the cross member retainer and a closed position rotate towards the cross member retainer and configured to press against the cross member, and a latch configured to lock the hinged brace in the closed position and maintain a pressure of the hinged brace against the cross member.

7 Claims, 14 Drawing Sheets

(56) References Cited

U.S. PATENT DOCUMENTS

| | | | |
|---|---|---|---|
| 7,219,915 B2* | 5/2007 | Christensen | B60D 1/46 |
| | | | 280/490.1 |
| 7,641,235 B1 | 1/2010 | Anduss | |
| 7,775,530 B2 | 8/2010 | Darling, III | |
| 7,784,813 B2 | 8/2010 | Columbia | |
| 7,854,460 B2 | 12/2010 | Tweet et al. | |
| 8,029,007 B2 | 10/2011 | Jones et al. | |
| 8,388,038 B2 | 3/2013 | Hastings | |
| 8,419,039 B1 | 4/2013 | Magalhaes et al. | |
| 8,820,598 B2* | 9/2014 | Tennyson | B60R 9/065 |
| | | | 224/509 |
| 2004/0213654 A1 | 10/2004 | Paxton | |
| 2005/0263554 A1 | 12/2005 | Naslund et al. | |
| 2007/0102464 A1* | 5/2007 | Garoffolo | B60R 9/042 |
| | | | 224/310 |
| 2008/0264989 A1 | 10/2008 | Barquinero et al. | |
| 2010/0026027 A1 | 2/2010 | Gao | |
| 2010/0096347 A1 | 4/2010 | Theobald et al. | |
| 2010/0260587 A1 | 10/2010 | LeAnna | |
| 2011/0133438 A1 | 6/2011 | Haines et al. | |
| 2012/0263561 A1* | 10/2012 | Li | B60R 9/0423 |
| | | | 414/462 |
| 2013/0264367 A1* | 10/2013 | Hill | B60R 9/06 |
| | | | 224/413 |
| 2014/0143990 A1 | 5/2014 | Sautter et al. | |
| 2014/0291370 A1 | 10/2014 | Donnigan | |
| 2015/0083769 A1* | 3/2015 | Williams | B60R 9/10 |
| | | | 224/488 |

* cited by examiner

UTILITY RACK SYSTEM

CROSS REFERENCE TO RELATED APPLICATIONS

This application is a continuation of U.S. patent application Ser. No. 14/031,471, entitled "Utility Rack System," filed on Sep. 19, 2013, the disclosure of which is hereby expressly incorporated by reference in its entirety.

FIELD OF THE DISCLOSURE

The present invention relates generally to a utility rack and more specifically it relates to a utility rack system which may be secured to a vehicle to allow a wide range of attachment functions.

BACKGROUND

Any discussion of the related art throughout the specification should in no way be considered as an admission that such related art is widely known or forms part of common general knowledge in the field.

Vehicles are commonly used to transport a wide range of materials and devices to various locations. In many cases, a vehicle may not be suited to transport the type of devices necessary for some functionality. For example, a vehicle may not have the room or capability to transfer a number of snowboards or other outdoor recreational vehicles.

To overcome this limited functionality, there are a number of different racks which may be purchased and installed on a vehicle for transporting various items. However, these racks are generally tailored to be used with a specific recreational device. For example, an enthusiast of both biking and skiing will often be required to purchase both a bike rack and a ski rack attachment for their vehicle. If that individual wishes to both bike and ski on the same excursion, it is often impossible to install both racks on the same vehicle, and thus two vehicles may be needed.

Because of the inherent problems with the related art, there is a need for a new and improved utility rack system which may be secured to a vehicle to allow attachment of a wide range of items.

SUMMARY

The invention generally relates to a utility rack which includes a base frame, a mounting member, an adjustment member, and one or more adjustable legs. The mounting member may be utilized to secure the base frame to a vehicle, such as through use of a towing hitch. The base frame is pivotally secured to the mounting member such that it may pivot with respect thereto. The adjustment member is utilized to adjust and lock the base frame into various positions with respect to the mounting member. The adjustable legs may be secured beneath the frame. The disclosure also includes a wide range of attachments which may be removably secured to the base frame for supporting various items.

There has thus been outlined, rather broadly, some of the features in order that the detailed description thereof may be better understood, and in order that the present contribution to the art may be better appreciated. There are additional features that will be described hereinafter and that will form the subject matter of the claims appended hereto. In this respect, before explaining various embodiments in detail, it is to be understood that the embodiments are not limited in its application to the details of construction or to the arrangements of the components set forth in the following description or illustrated in the drawings. Other embodiments are capable of other embodiments and of being practiced and carried out in various ways. Also, it is to be understood that the phraseology and terminology employed herein are for the purpose of the description and should not be regarded as limiting.

BRIEF DESCRIPTION OF THE DRAWINGS

Various other objects, features and attendant advantages of the present invention will become fully appreciated as the same becomes better understood when considered in conjunction with the accompanying drawings, in which like reference characters designate the same or similar parts throughout the several views, and wherein.

DETAILED DESCRIPTION

A. Overview

Turning now descriptively to the drawings, in which similar reference characters denote similar elements throughout the several views, FIGS. 1 through 8 illustrate a utility rack system 10, which comprises a base frame 20, a mounting member 30, an adjustment member, and one or more adjustable legs 50. The mounting member 30 may be utilized to secure the base frame 20 a vehicle 12, such as through use of a towing hitch 13. The base frame 20 is pivotally secured to the mounting member 30 such that it may pivot with respect thereto. The adjustment member 40 is utilized to adjust and lock the base frame 20 into various positions with respect to the mounting member 30. The adjustable legs 50 may be secured beneath the frame 20. Various embodiments also include a wide range of attachments 80, 90, 100, 120, 130, 140 which may be removably secured to the base frame 20 for supporting various items.

B. Base Frame

Figure 1:
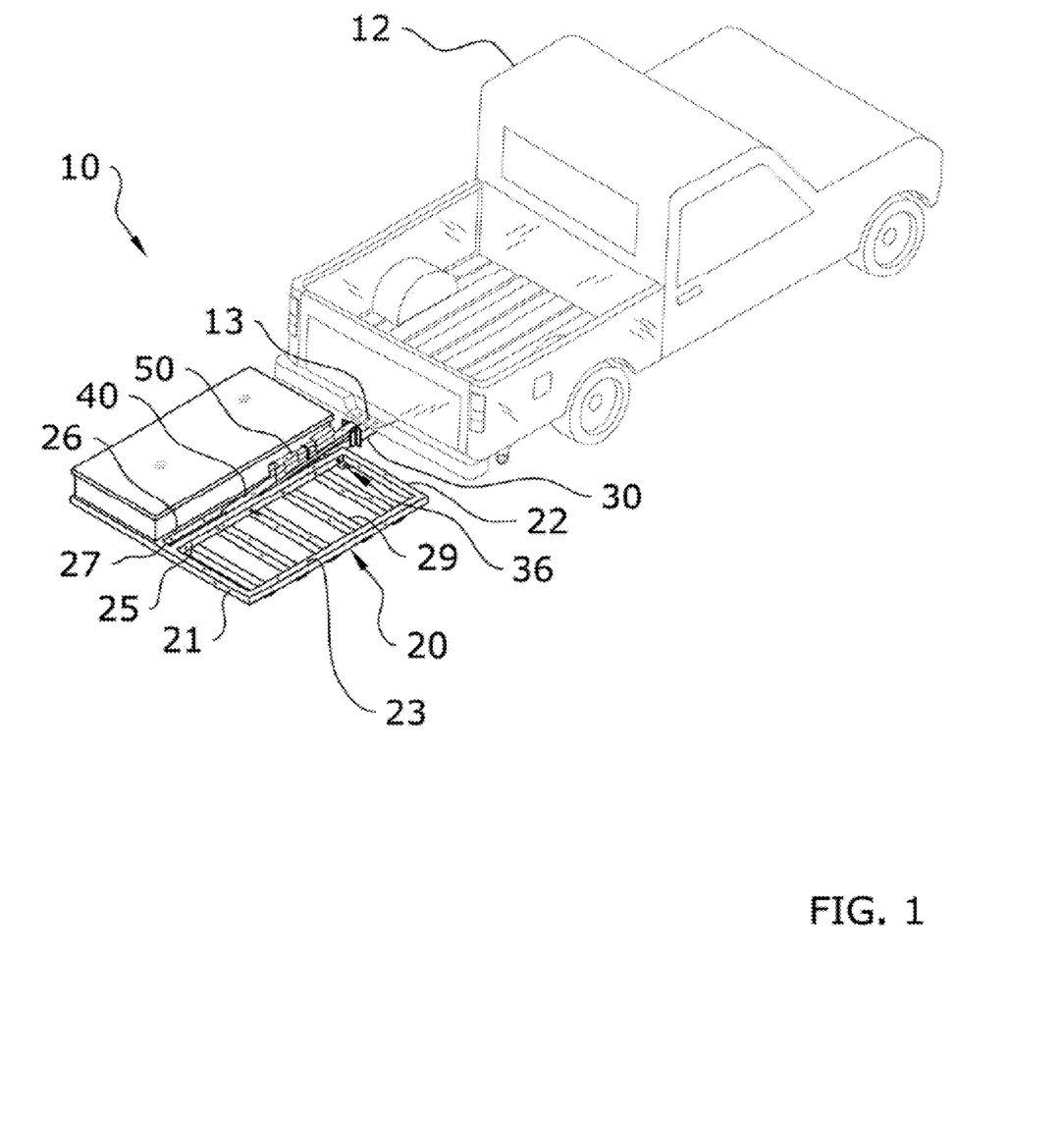
FIG. 1 is an upper perspective view of a utility rack installed on a pickup truck, in accordance with various embodiments.
Figure 2:
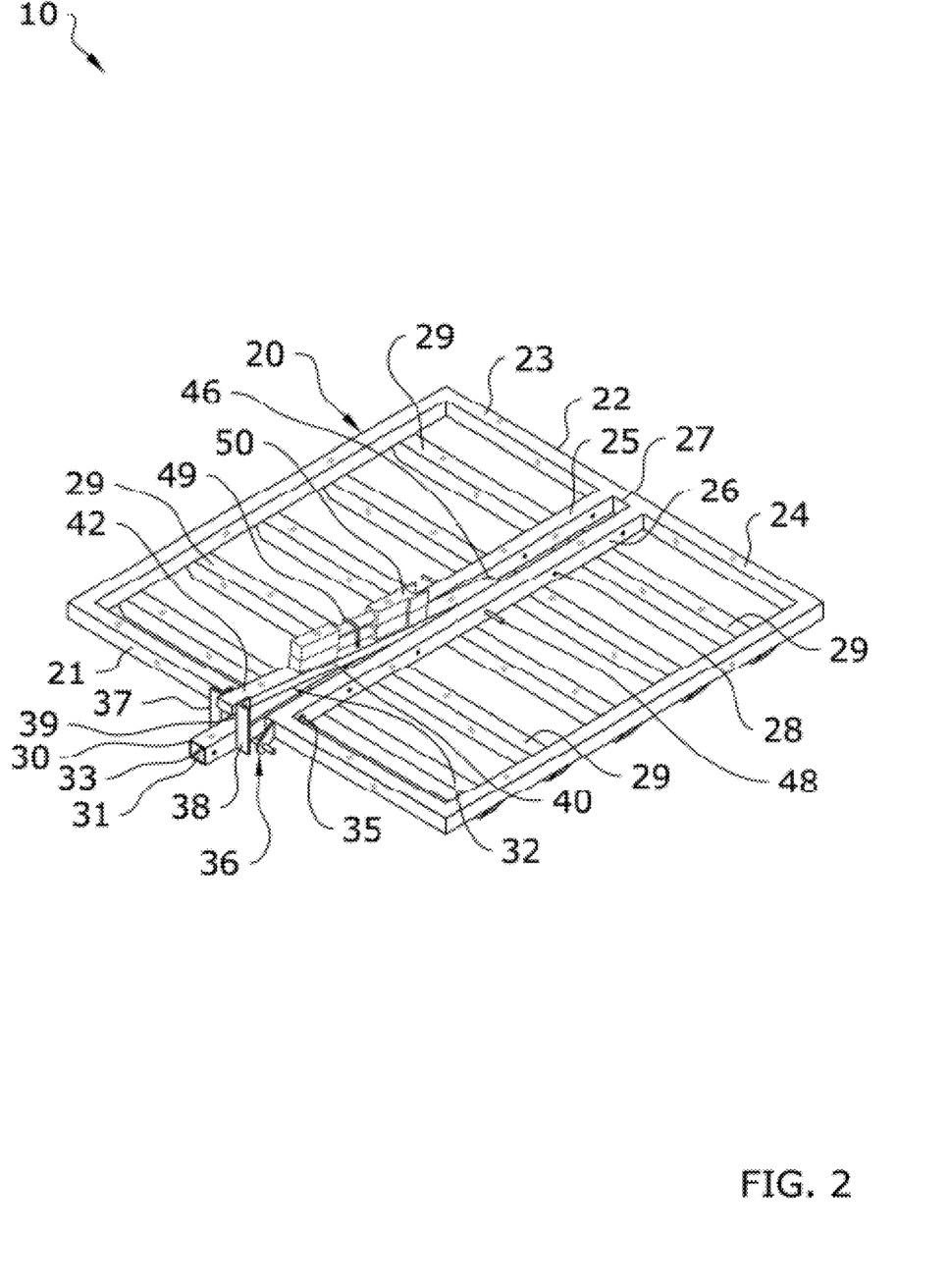
FIG. 2 is an upper perspective view of the base frame in a compacted position, in accordance with various embodiments.
Figure 3:
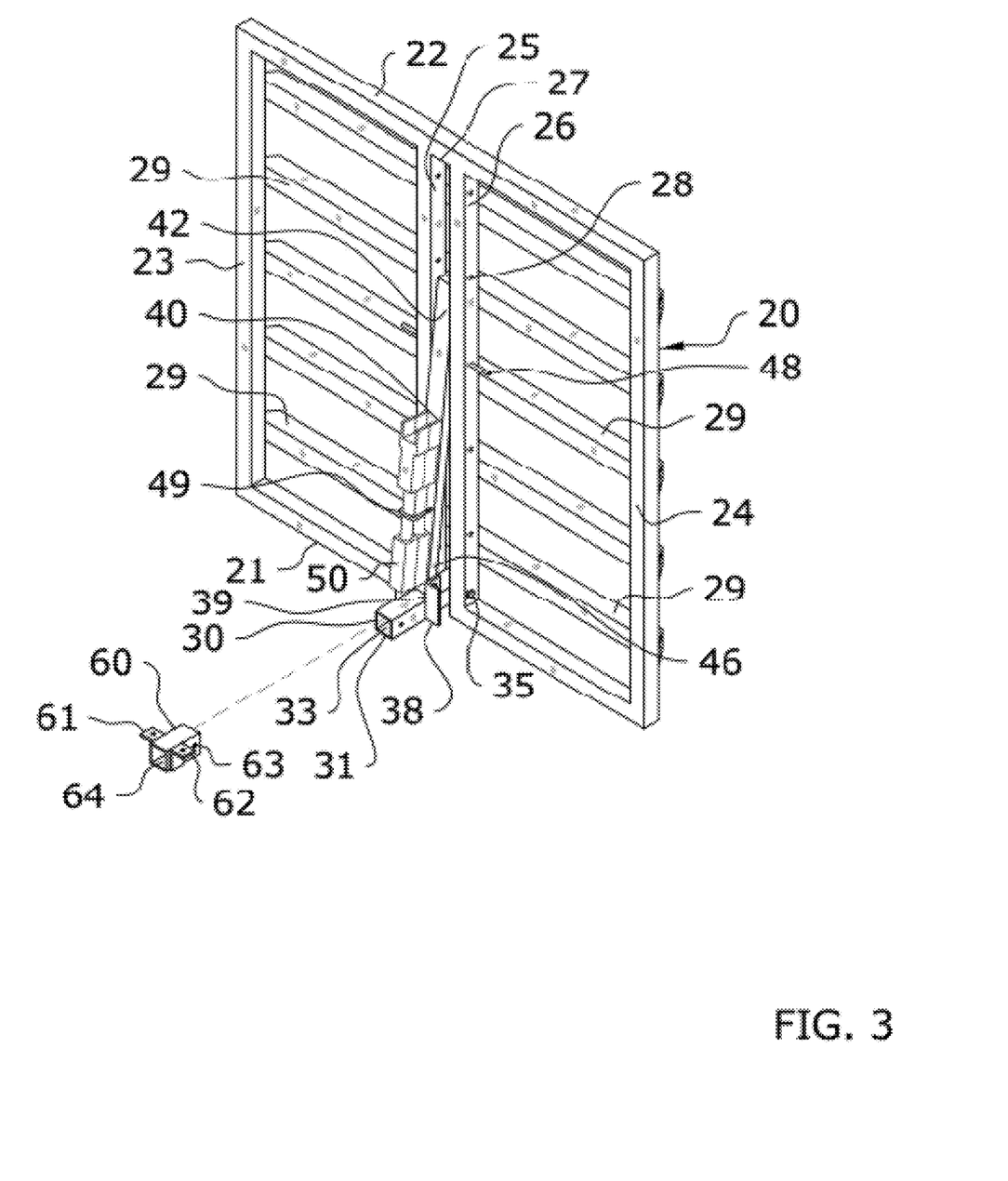
FIG. 3 is an upper perspective view of the base frame in an upright position, in accordance with various embodiments.

As best shown in FIGS. 1-3, the utility rack includes a base frame 20 which is adapted to be removably secured to a vehicle 12, such as through use of a trailer hitch 13. The base frame 20 acts as a base attachment point for a wide range of attachment devices which will be described herein. It is appreciated that the structure, shape, size, and configuration of the base frame 20 may vary, and thus it should not be construed as being limited by the exemplary figures.

In the embodiment shown in the figures, the base frame 20 comprises a rectangular frame structure comprised of a pair of rectangular portions 23, 24 which are linked together to form the overall frame 20. The first portion 23 includes a first inner support 25 and the second portion 24 includes a second inner support 26, the inner supports 25, 26 being spaced apart from each other to define a centralized slot 27 into which the adjustment member 40 will be positioned as best shown in FIG. 3. Each of the inner supports 25, 26 includes a plurality of apertures 28 extending there across for use in locking the adjustment member 40 in various locations within the slot 27.

While the present disclosure refers to the portions 23, 24 separately, it is appreciated that the base frame 20 may be integrally formed of a unitary structure. However, in some embodiments, the base frame 20 may be comprised of discrete, interconnected structures.

The base frame 20 includes a first end 21 adapted to be secured to a vehicle 12 and a second end 22 which, in some configurations, may be swung into various positions. A plurality of cross members 29 extend across the base frame 20, parallel to its respective ends 21, 22. The cross members 29 are utilized both to secure various attachment as well as to mount the adjustable support legs 50 as described herein. In most embodiments, the cross members 29 will extend across the slot 27.

As best shown in FIG. 2, a stopper assembly 36 may be secured to the first end 21 of the base frame 20. The stopper assembly 36 may be comprised of a cross bar which will restrict full rotation of the base frame 20 with respect to the mounting member 30. Thus, the stopper assembly 36 will cause the base frame 20 to rest in a lowered, horizontal state as shown in FIG. 2.

C. Mounting Member

As best shown in FIGS. 2 and 3, the utility rack includes a mounting member 30 which is used to removably secure the base frame 20 to a vehicle 12, such as through use of a trailer hitch 13. The mounting member 30 extends from the first end 21 of the base frame 20 and may be integrally formed with, or removably secured, thereto.

A first end 31 of the mounting member 30 will be positioned at the first end 21 of the base frame 20 and the second end 32 will be positioned outward therefrom. The first end 31 includes a pivot aperture 34 through which a pivot pin 35 extends such that the base frame 20 may pivot with respect to the mounting member 30. The second end 32 will include a receiver opening 33 for interconnecting with a standard hitch 13.

The mounting member 30 includes a first linkage member 37 and a second linkage member 38 extending upwardly therefrom. The linkage members 37, 38 are generally comprised of a bracket or clamp configuration when combined so as to define a central slot 39. The adjustment member 40 is adapted to be secured within the slot 39 between the linkage members 37, 38 as shown in the figures.

D. Adjustment Member

An adjustment member 40 can be included with the present invention for aiding with the adjustment and locking of the base frame 20 in various positioned with respect to the mounting member 30. The base frame 20 may be positioned horizontally such as shown in FIGS. 1 and 2, vertically as shown in FIG. 3, or at various locations therebetween. Thus adjustment of the base frame 20 will allow for a wide range of attachments to be secured thereto.

As shown throughout the figures, the adjustment member 40 is generally comprised of an elongated member such as a rod having a first end 42 and a second end 46. The first end 42 of the adjustment member 40 includes a first pin 44 which will extend through both the adjustment member 40 as well as the linkage members 37, 38 so as to allow the adjustment member 40 to pivot within the slot 39 of the linkage members 37, 38 where it is removably secured.

Figure 14:
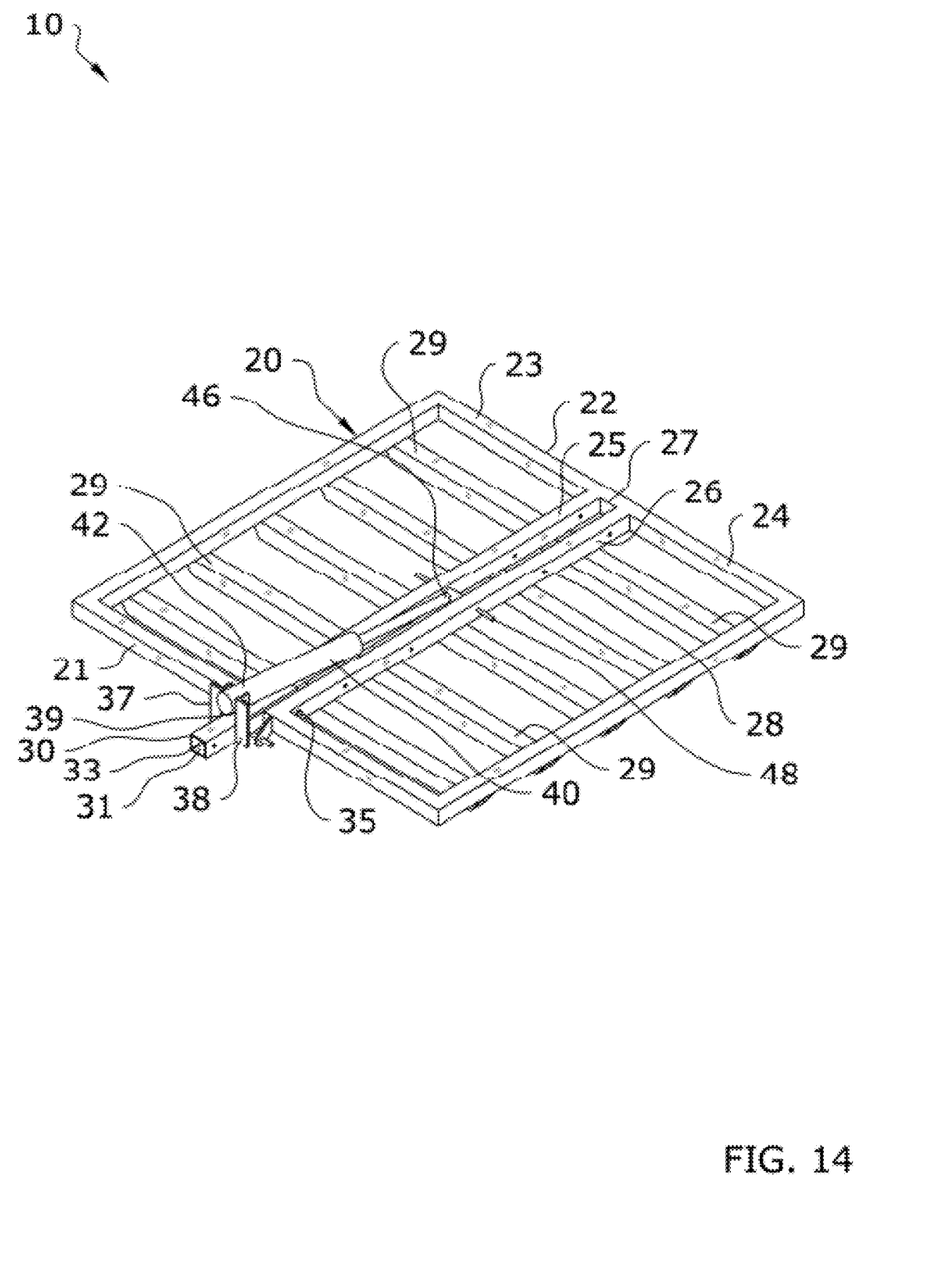
FIG. 14 is an upper perspective view of an alternate embodiment of the base frame utilizing a hydraulic adjustment member, in accordance with various embodiments.

The second end 46 of the adjustment member 40 includes a second pin 48 which may be extended through both the adjustment member 40 as well as the desired apertures 28 of the inner supports 25, 26 to position the adjustment member 40 at various locations within the slot 27 of the base frame 20. By locking the second end 46 of the adjustment member 40 within various locations of the slot 27, the positioning of the base frame 20 with respect to the mounting member 30 may be easily adjusted. FIG. 14 illustrates an alternate embodiment of the adjustment member 40 in which it is hydraulically-operated. In such an embodiment, the adjustment member 40 will be comprised of a hydraulic cylinder which may be operated by various hydraulic means, such as a pump.

E. Support Legs

Figure 4:
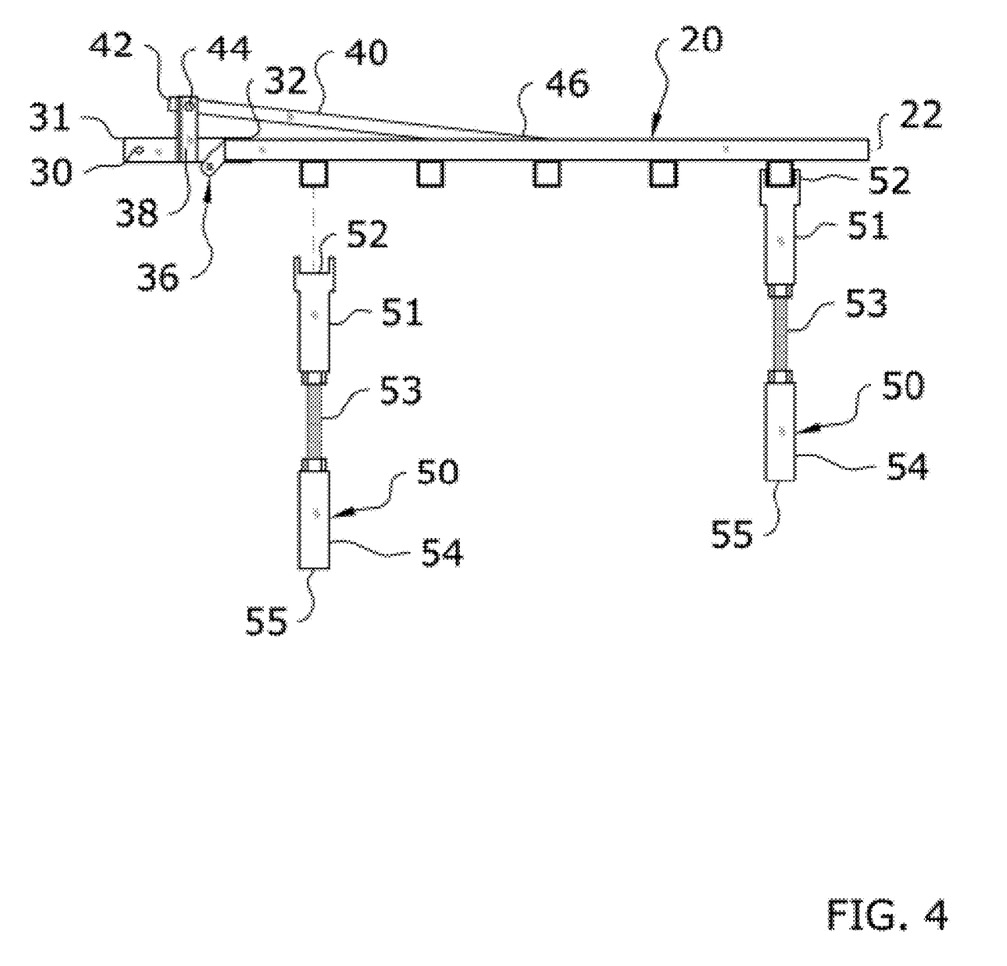
FIG. 4 is a side view of the base frame illustrating installation of the leg supports, in accordance with various embodiments.

As shown throughout the figures, the utility rack can include one or more adjustable legs 50 which may be utilized as a stand for the base frame 20 so that it may rest in a horizontal position, such as is shown in FIG. 4. Each adjustable leg 50 includes an upper member 51 and a lower member 54 linked by an adjustment rod 53.

In some embodiments, the upper member 51 will be threadably secured to a first end of the adjustment rod 53 and the lower member 54 will be threadably secured to a second end of the adjustment rod 53 such that its effective length may be adjusted. The upper member 51 of the adjustable leg 50 includes a bracket 52 adapted to engage with the cross members 29 of the base frame 20 to secure the leg 50 thereto as best shown in FIG. 4. The lower member 54 includes a foot 55 on which will rest on the ground.

When not in use, the legs 50 may be secured to the adjustment member 40 through use of a leg retainer 49. Such a configuration is shown throughout the figures and best shown in FIGS. 1-3. The legs 50 may be stacked on top of the adjustment member 40 and secured thereto with the retainer 49. A wide range of retainers 49 may be utilized, including clamps, brackets, pins, bolts, straps, and the like.

F. Vehicle Receiver

A vehicle receiver 60 may be provided to interface between the base frame 20 and the hitch 13 of the vehicle 12. The vehicle receiver 60 aids with removably securing the mounting member 30 to a vehicle 12. As best shown in FIG. 3, the vehicle receiver 60 is comprised of a rube-structure which may be comprised of various cross-sections, including without limitation square-and-circular-shaped cross-sections.

The outer width/circumference of the vehicle receiver 60 will preferably be slightly smaller than the outer width/circumference of the mounting member 30 so that the vehicle receiver 60 may frictionally engage within the receiver opening 33 of the mounting member 30. A channel 64 runs through the vehicle receiver 60 for alternate embodiments in which the mounting member 30 instead fits within the vehicle receiver 60.

The vehicle receiver 60 includes a first bracket 61 and a second bracket 62 extending outwardly from its respective first and second sides to aid in removably securing to the vehicle 13. The brackets 61, 62 may be removably secured underneath the bumper or at various other locations along the outer frame of a vehicle 12 to act as an interface for securing the mounting member 30 thereto. An aperture 63 extends horizontally through the body of the vehicle receiver 60 through which a fastener may be extended to removably secure the vehicle receiver 60 to the mounting member 30, which may include corresponding apertures as shown.

G. Connector Member

Figure 5:
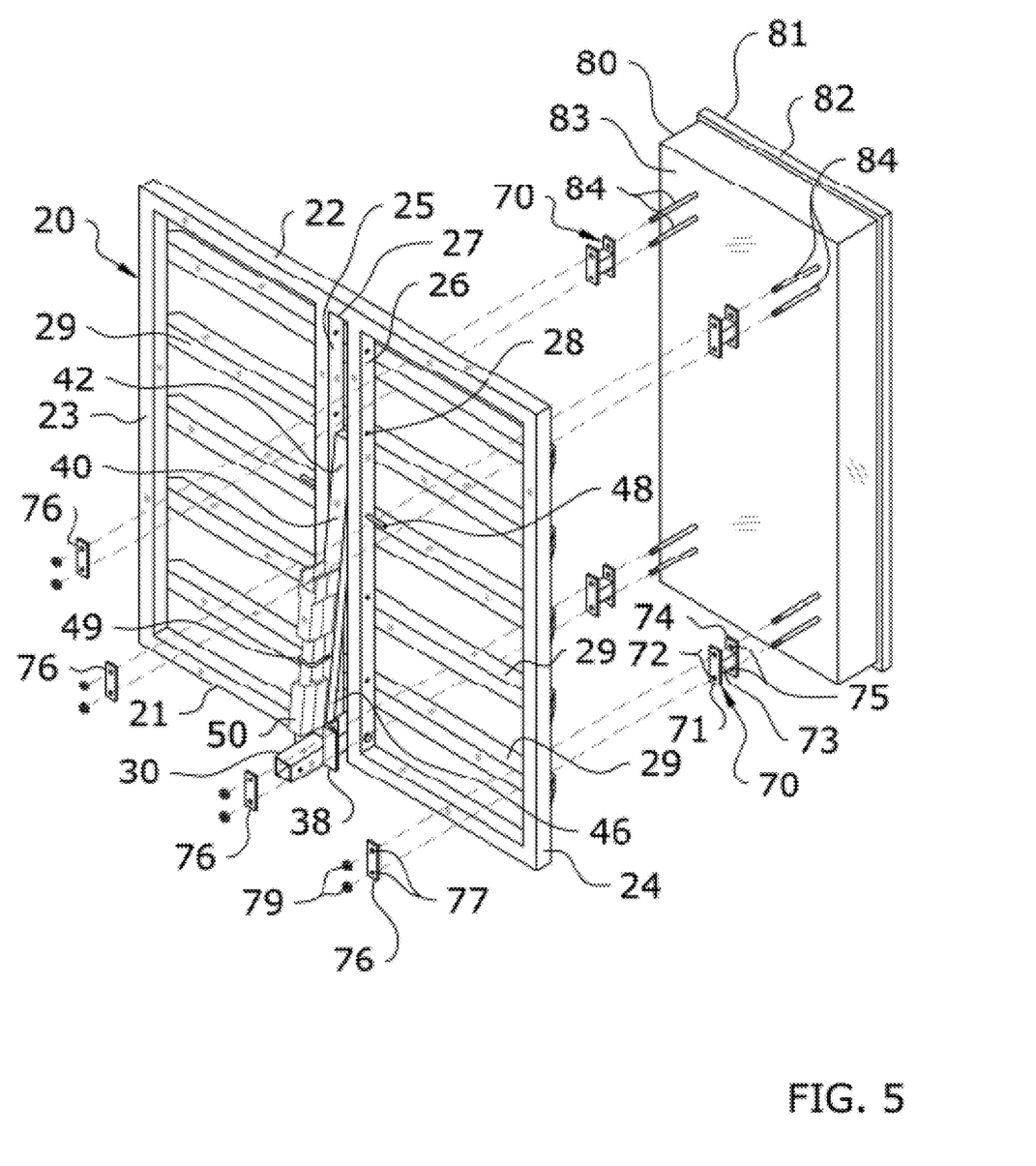
FIG. 5 is an upper perspective view illustrating a first storage attachment being secured to the base frame, in accordance with various embodiments.

As best shown in FIG. 5, connector members 70 may be provided to aid with securing various attachments to the base frame 20. Each connector member 70 comprises a central portion 73 having an outer bracket 71 extending from a first end thereof and an inner bracket 74 extending from a second end thereof. The brackets 71, 74 are preferably vertically oriented as shown in the figures.

The outer bracket 71 includes at least one aperture 72 and the inner bracket 74 similarly includes at least one corresponding aperture 75. The apertures 72, 75 of the respective brackets 71, 74 are preferably aligned so that a fastener 84 may pass therethrough. Fasteners 84 which are secured to various attachments 80 may be secured within these apertures 72, 75 to secure the attachment 80 to the connector member 70, such as through usage of nuts 79 as shown in FIG. 5.

A retainer plate 76 is provided to engage with the connector member 70, wherein the retainer plate 76 and connector member 70, when assembled, will sandwich a cross member 29 therebetween. Any fasteners 84 extending from the attachment 80 will extend through the aperture 72 of the outer bracket 71, the aperture 75 of the inner bracket 74 before extending around the cross member 29 and being terminated within the aperture 77 of the retainer plate 76 and secured therein. Thus, an attachment 80 may easily be secured to and removed from the base frame 20.

H. First Storage Attachment

Figure 6:
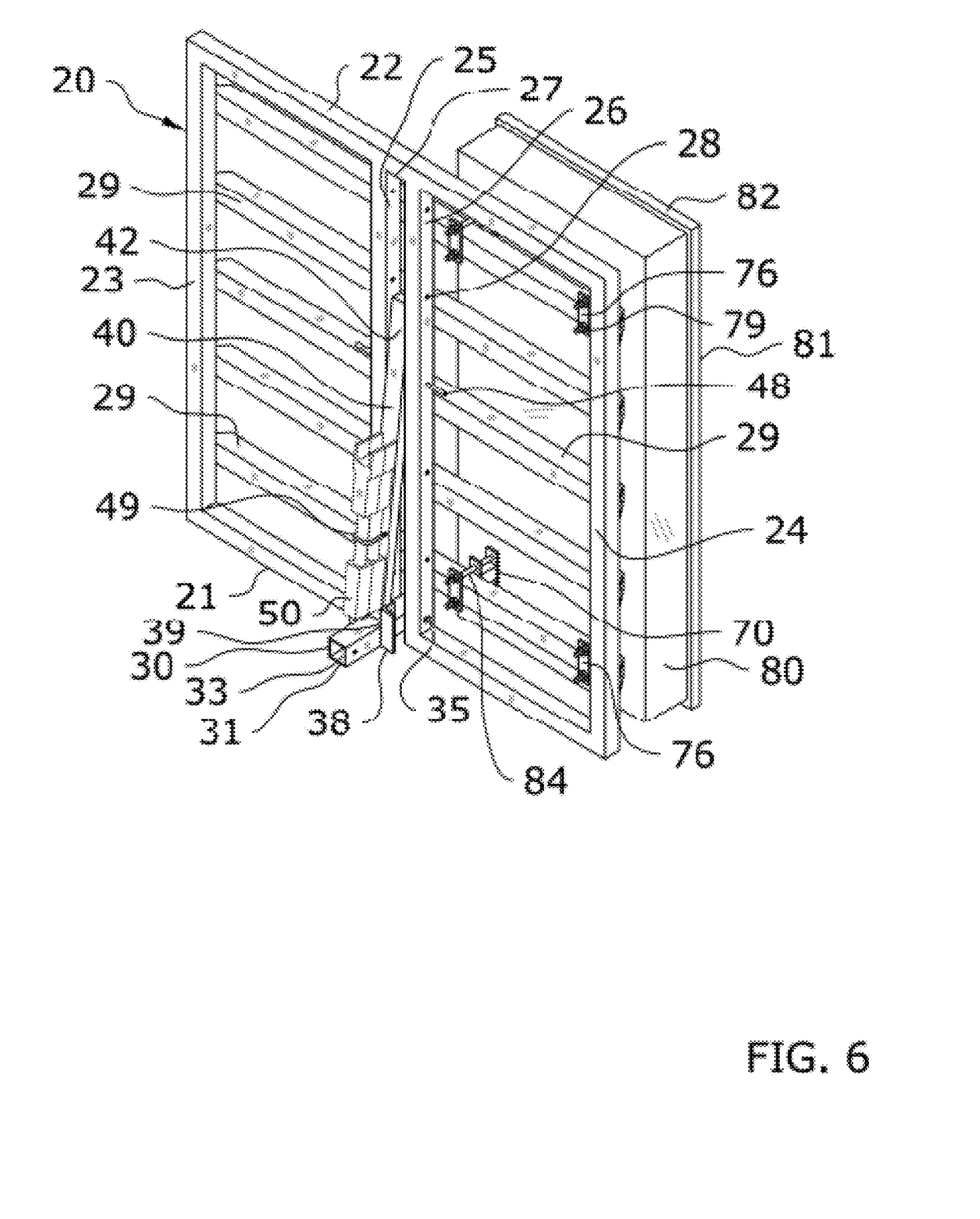
FIG. 6 is an upper perspective view of the first storage attachment secured to the base frame, in accordance with various embodiments.

FIGS. 5 and 6 illustrate a first storage attachment 80 for use with a utility rack. The first storage attachment 80 is comprised of a storage box which may be removably secured to the base frame 20, preferably when in an upright position as shown in FIGS. 5 and 6.

The first storage attachment 80 includes an outer end 81 which may include an access door 82 providing access to an internal cavity in which various items may be stored. The inner end 83 of the first storage attachment 80 preferably includes one or more fasteners 84 which extend through the connector members 70 and retainer plate 76 to secure the first storage attachment 80 to the base frame 20 as shown in the figures.

I. Tray Attachment

Figure 7:
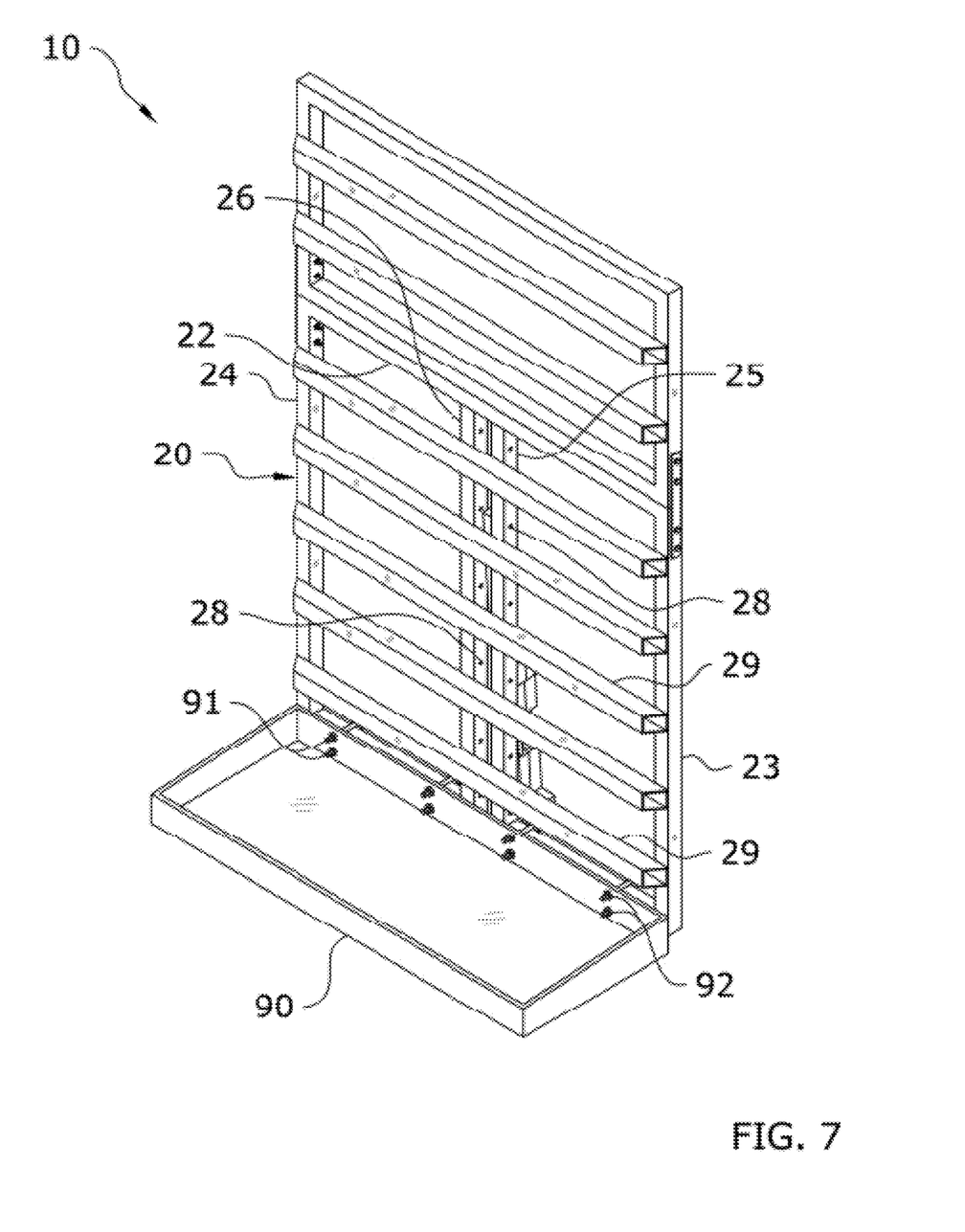
FIG. 7 is an upper perspective view illustrating the tray attachment secured to the base frame, in accordance with various embodiments.

FIG. 7 illustrates a tray attachment 90 which may be removably secured to the base frame 20, preferably when the base frame 20 is in an upright position. While the figure illustrates the tray attachment 90 being secured to the lowermost cross member 29, it is appreciated that the tray attachment 90 may be secured to any of the cross members 29 of the base frame 20. In some embodiments, multiple tray attachments 90 may be secured to a single base frame 20 by using multiple cross members 29.

The tray attachment 90 generally includes apertures through which fasteners 91 may be extended which will be positioned on either side of a cross member 29 of the base frame 20 before terminating into a retainer plate 76. Nuts 92 may be utilized to secure the fasteners 91 within both the tray attachment 90 and the retainer plate 76 as shown in FIG. 7.

J. Ski/Snowboard Retainers

Figure 8:
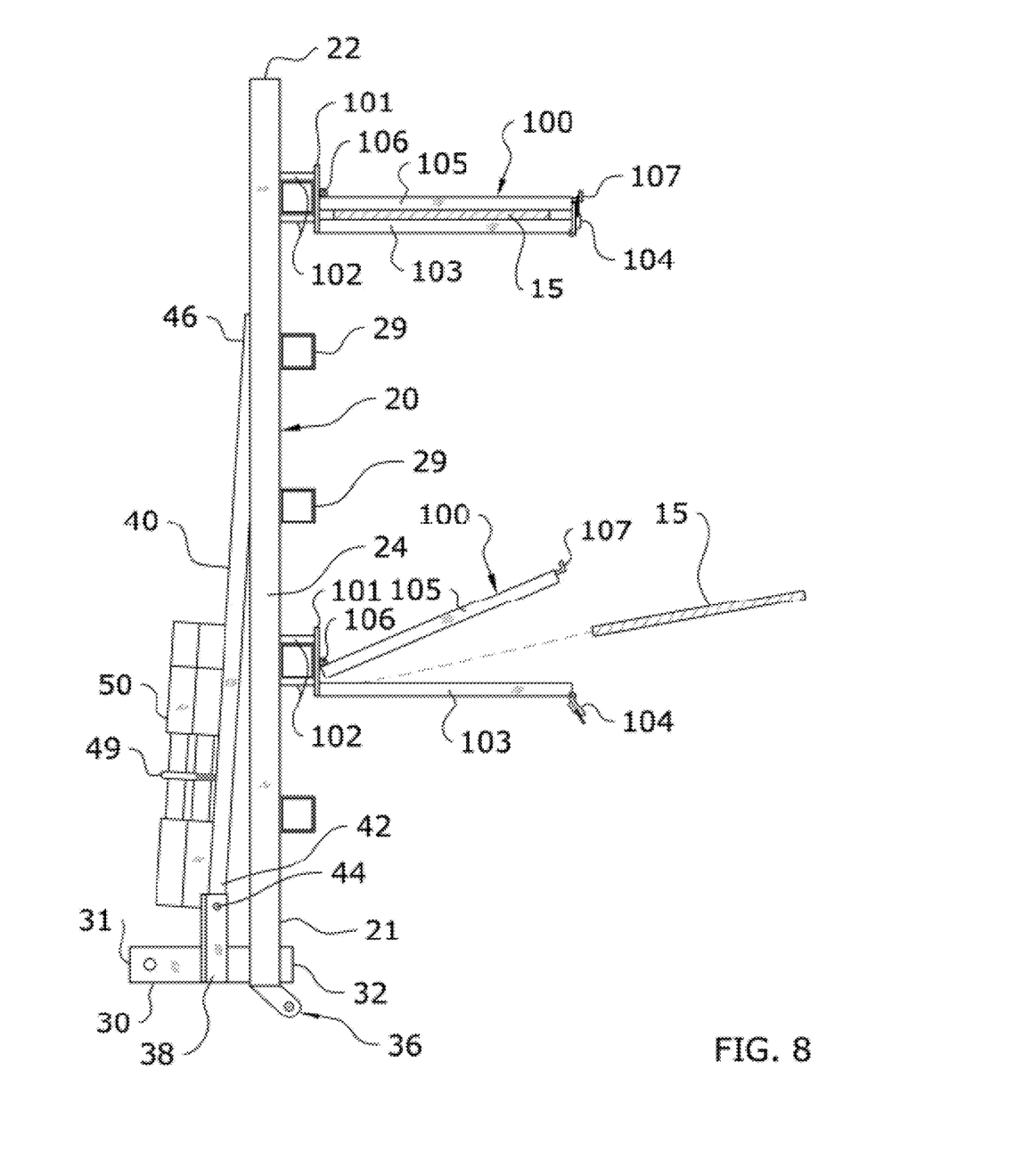
FIG. 8 is a side view illustrating the ski/snowboard retainers secured to the base frame, in accordance with various embodiments.
Figure 9:
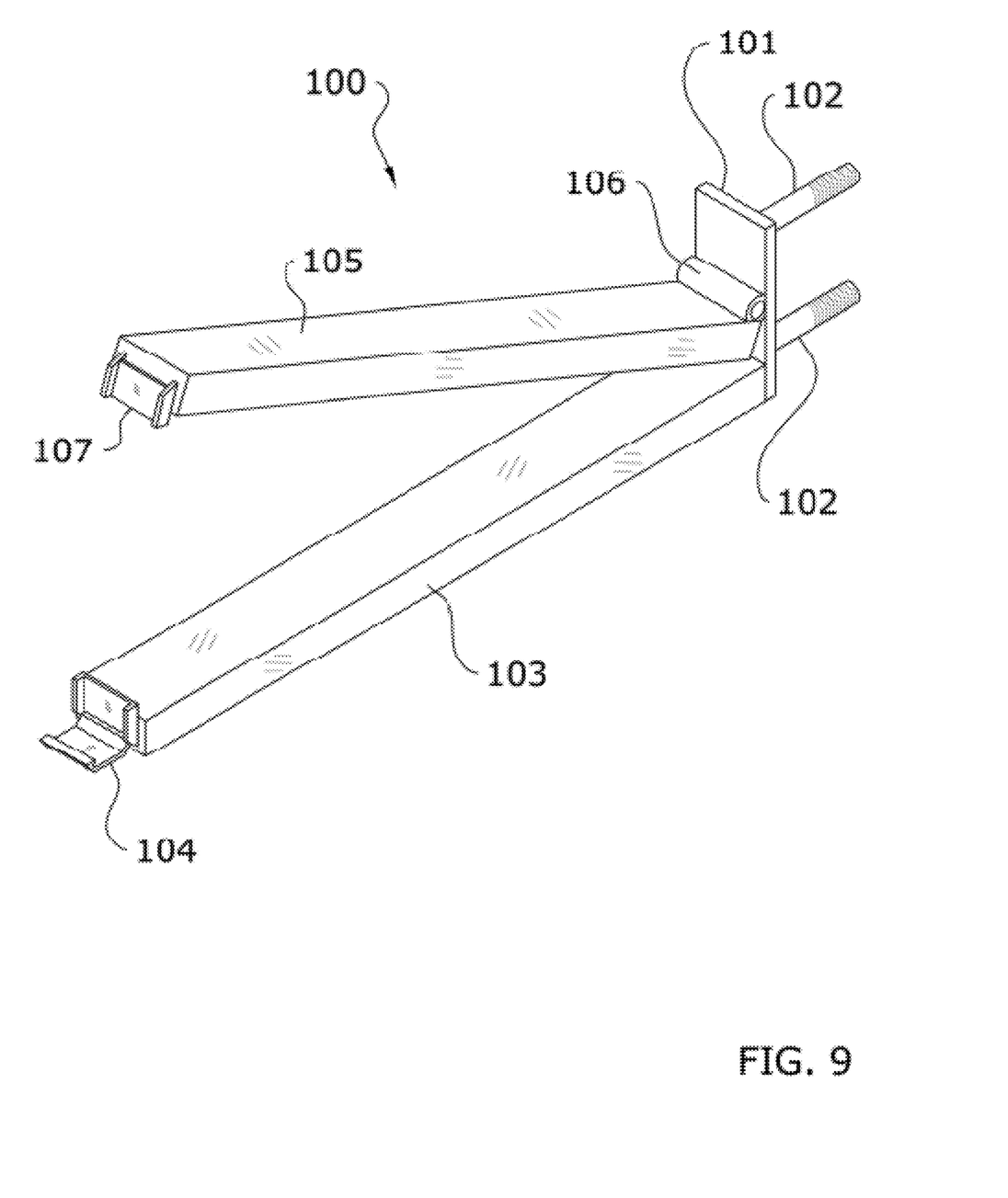
FIG. 9 is an upper perspective view of a ski/snowboard retainer, in accordance with various embodiments.

FIGS. 8 and 9 illustrate ski/snowboard retainers 100 which may be utilized with the utility rack to ease transport of skis or snowboards 15. As shown in FIG. 8, generally a pair of retainers 100 will be positioned on a single cross bar 29 in spaced-apart relationship to secure a single snowboard 15 or set of skis therein.

As best shown in FIG. 9, each ski/snowboard retainer 100 comprises a base connector 101 having a pair of fasteners 102 extending therefrom in a first direction. An upper arm 105 and a lower arm 103 extend in a second direction from the opposite side of the base connector 101 with respect to the fasteners 102.

The lower arm 103 is fixedly secured to the base connector 101 and includes a latch 104 or other linkage on its distal end. The upper arm 105 is hingedly secured to the base connector 101 using a hinge 106 and includes a corresponding locking member 107 on its distal end.

By positioning the ski or snowboard 15 between the upper and lower arms 103, 105, lowering the upper arm 105 onto the lower arm 103 to sandwich the snowboard 15 therebetween, and locking the locking member 107 within the latch 104, the snowboard 15 or ski may be secured therein. The fasteners 102 will be positioned around a cross member 29 of the base frame 20 and secured thereto using a retainer plate 79 as shown in FIG. 8.

K. Second Storage Attachment

Figure 10:
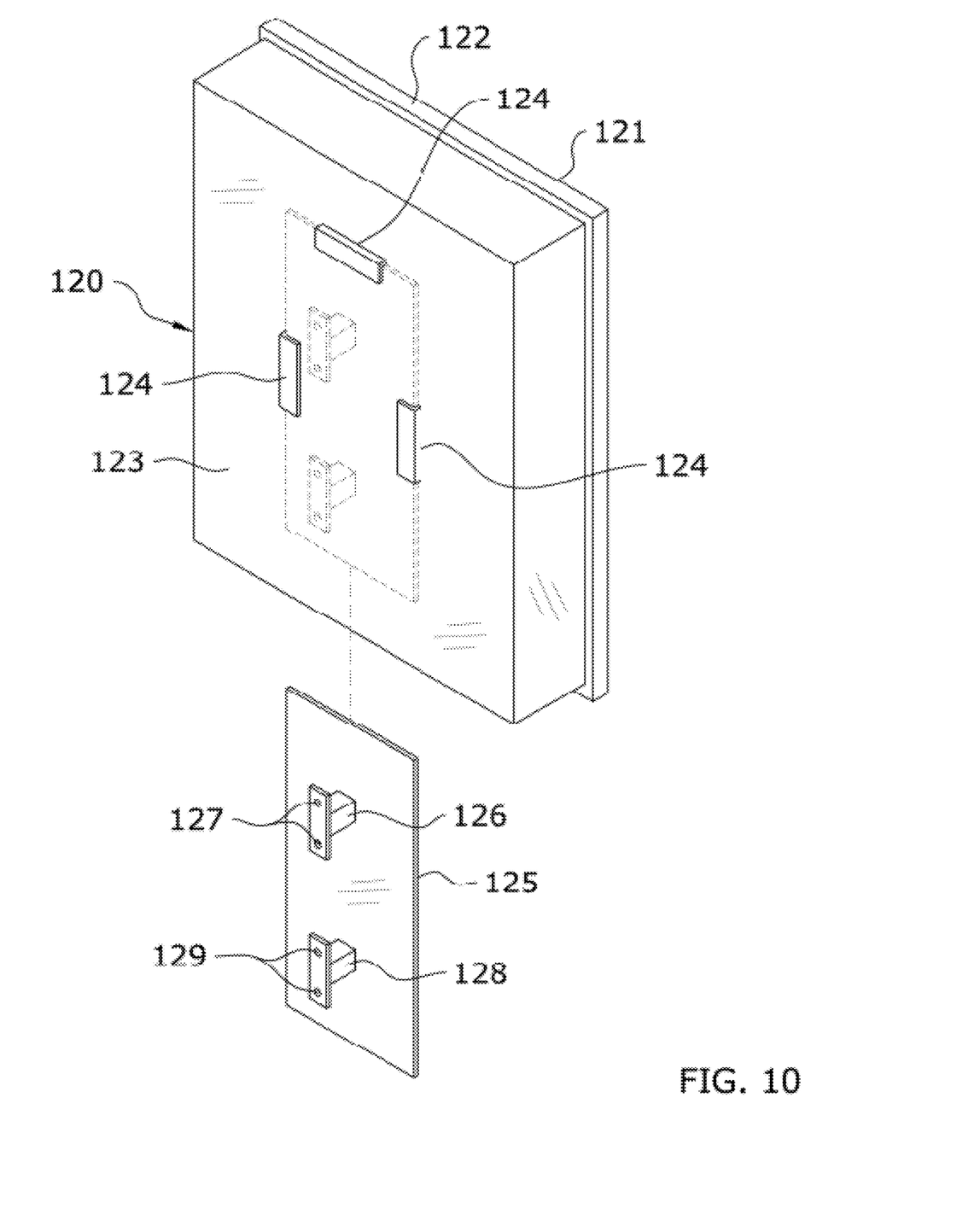
FIG. 10 is a rear perspective view of a second storage attachment, in accordance with various embodiments.

A second storage attachment 120 is illustrated in FIG. 10. The second storage attachment 120 is comprised of a storage box which may be removably secured to the base frame 20. The second storage attachment 120 includes an outer end 121 having an access door 122 providing access to an internal compartment for storage of various items.

The inner end 123 of the second storage attachment 120 includes a plurality of retainer clips 124 which are adapted to removably receive a mounting plate 125 which aids in securing the second storage attachment 120 to the base frame 20. The mounting plate 125 includes a first mounting bracket 126 having a pair of apertures 127 and a second mounting bracket having its own pair of apertures 129 extending from a rear end thereof.

The brackets 126, 128 are preferably vertically spaced-apart as shown in FIG. 10, though other configurations may be utilized. By using fasteners in connection with a retainer plate 79, the brackets 126, 128 may be secured to a cross member 29 of the base frame 20 to removably secure the second storage attachment 120 thereto.

L. Third Storage Attachment

Figure 11:
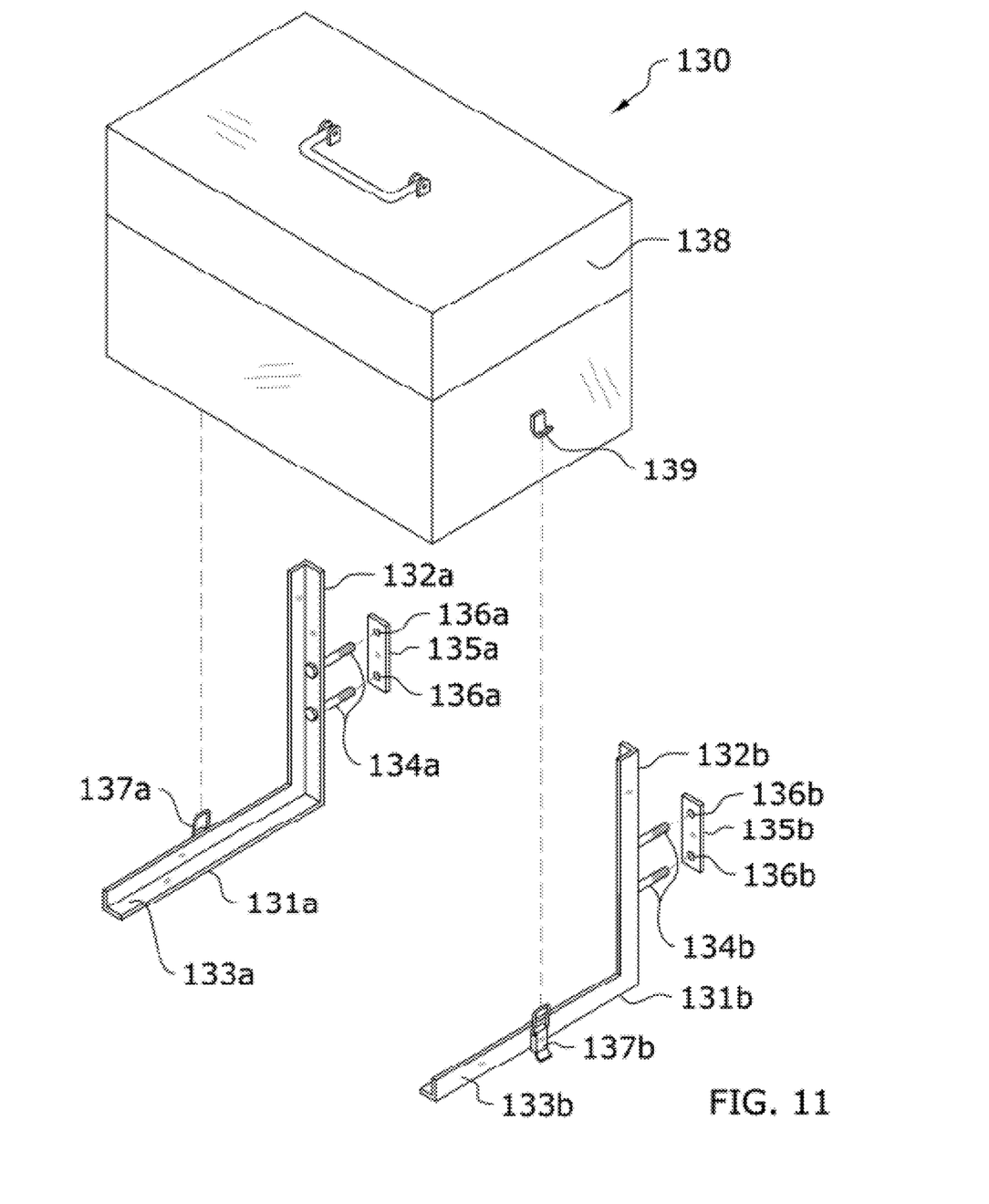
FIG. 11 is an upper exploded perspective view of a third storage attachment, in accordance with various embodiments.
Figure 12:
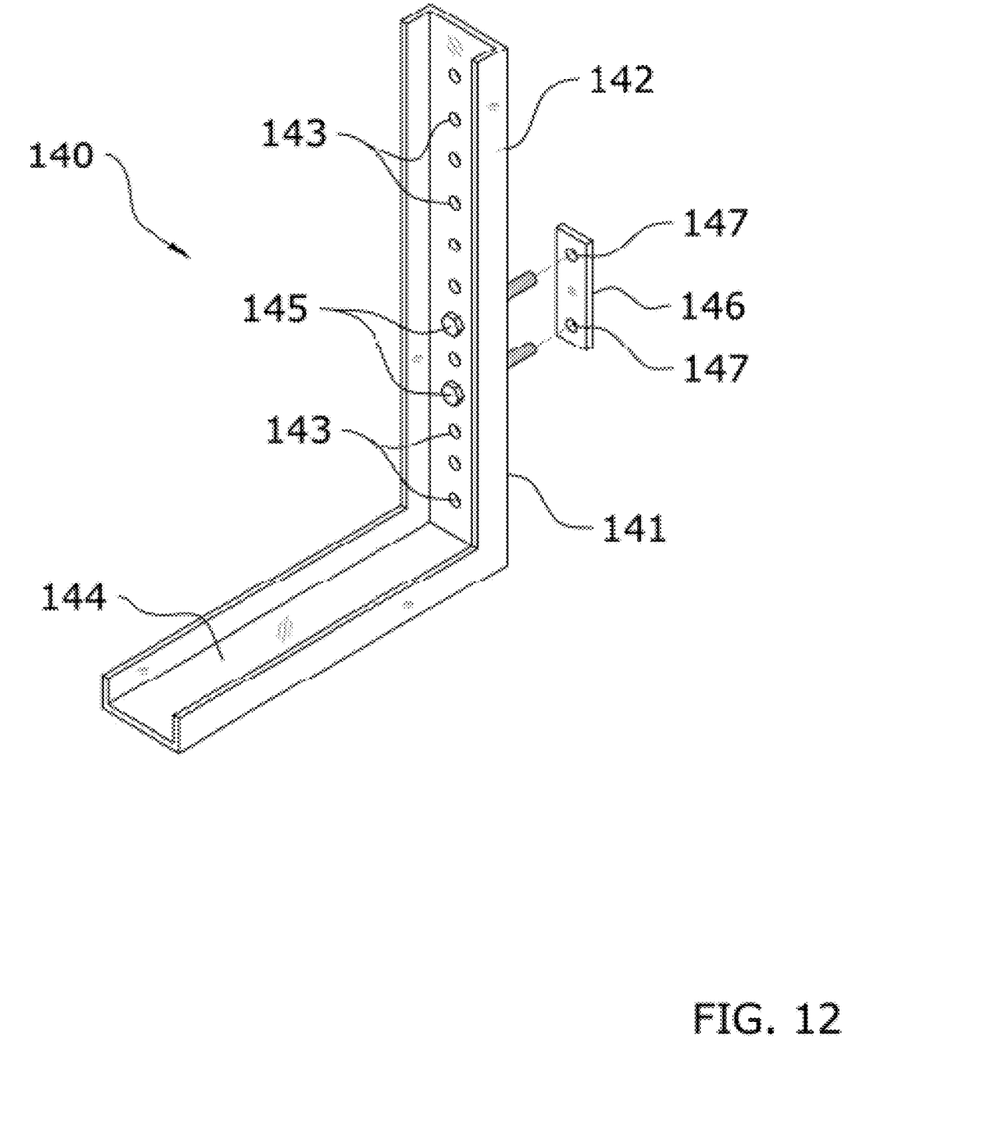
FIG. 12 is an upper perspective view of a retention bracket for use with the bike retainers, in accordance with various embodiments.

FIGS. 11 and 12 illustrate a third storage attachment 130 for use with the present invention. The third storage attachment 130 comprises a box 139 which is removably secured to the base frame 20 through use of a pair of retention brackets 131. Each retention bracket 131 comprises a vertical member 132 and a horizontal member 133, the horizontal member 133 extending from a lower end of the vertical member 132 as shown in FIG. 12.

The vertical member 132 includes a pair of fasteners 134 extending therefrom which, in combination with a corresponding locking plate 135, will be secured around a cross member 29 of the base frame 20. The locking plate 135 will include apertures 136 through which the fasteners 134 may extend and in which the fasteners 134 may be secured after being positioned around the cross member 29.

The horizontal member 133 includes a locking clip 137 positioned on an outer surface thereof as shown in FIG. 11. Generally, a first retention bracket 131a will be secured to a first position on a single cross bar 29 and a second retention bracket 131b will be secured to a second, horizontally-spaced apart position on the same cross bar 29. The box 138 is then positioned between the brackets 131a, 131b to rest on their respective horizontal members 133a, 133b. The respective locking clips 137a, 137b may be used to lock onto a corresponding locking extension 139 which extends outwardly from either side of the box 138 to secure the box 138 within the retention brackets 131a, 131b.

M. Bike Retainers

Figure 13:
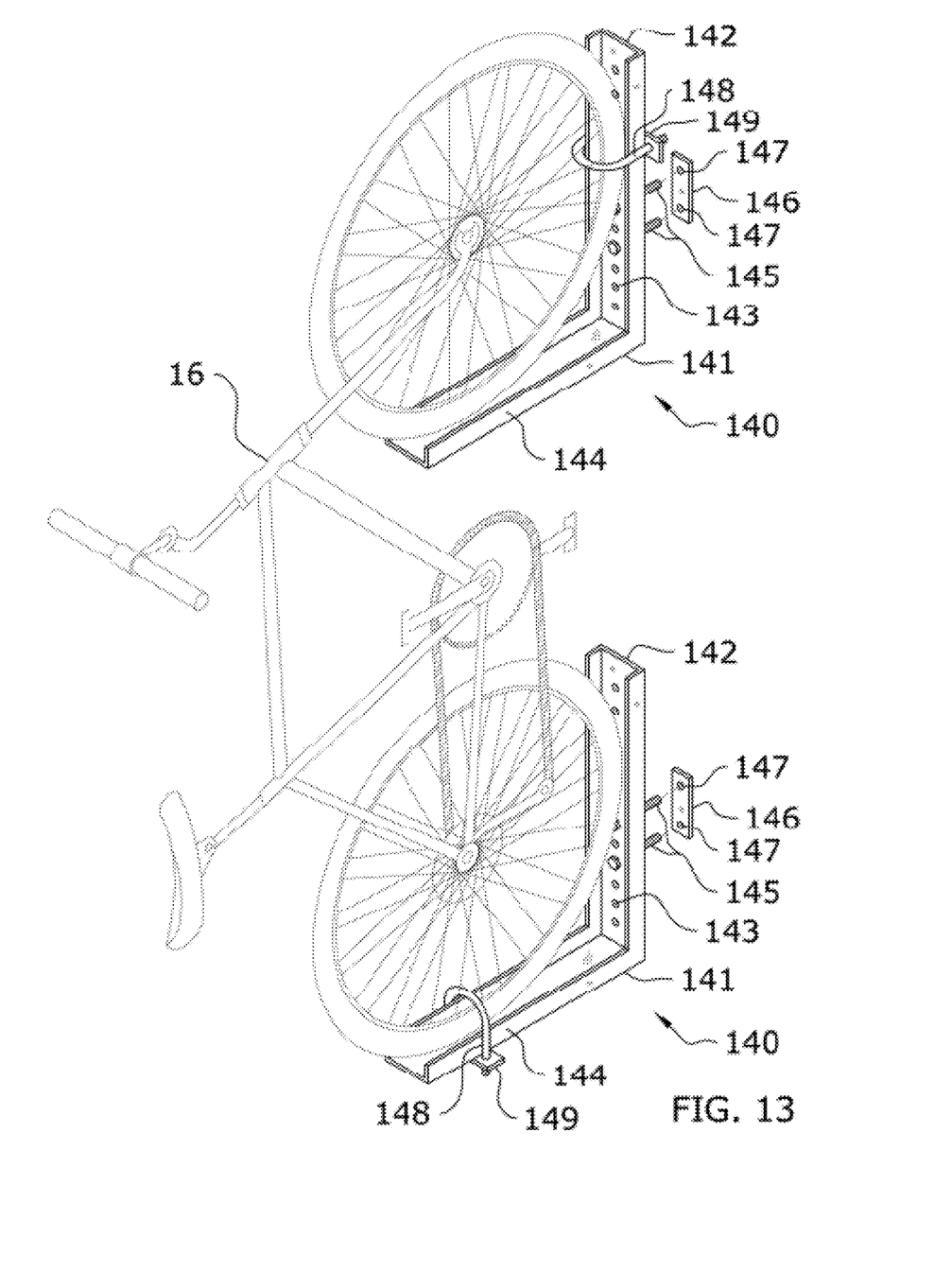
FIG. 13 is an upper perspective view illustrating the bike retainers in use to retain a bike, in accordance with various embodiments.

As shown in FIG. 13, the present invention may utilize bike retainers 140 can be used to secure a bike 16 to the base frame 20. The bike retainers 140 include a pair of retention brackets 141, each having a vertical member 142 and a horizontal member 144 extending outwardly from a lower end of the vertical member 142. A plurality of apertures 143 extend through the vertical member 142 for receiving fasteners 145 as shown in FIG. 13.

A locking plate 146 is provided such that the fasteners 145 may extend around a cross bar 29 and be secured therearound by terminating within apertures 147 of the locking plate. Preferably, a first retention bracket 141 will be secured to a first cross bar 29 and a second retention bracket 141 will be secured in vertically spaced-apart relationship with the first retention bracket 141 on a second cross bar 29. Each wheel of the bike 16 may then be positioned within one of the brackets 141. A separate securing member 148, such as a U-shaped lock, may be utilized to secure the wheels of the bike 16 to the brackets 141, such as by using a separate locking plate 149 as shown.

Unless otherwise defined, all technical and scientific terms used herein have the same meaning as commonly understood by one of ordinary skill in the art. Although methods and materials similar to or equivalent to those described herein can be used in the practice or testing, suitable methods and materials are described above. All publications, patent applications, patents, and other references mentioned herein are incorporated by reference in their entirety to the extent allowed by applicable law and regulations. Aspects of the present disclosure may be embodied in other specific forms without departing from the spirit or essential attributes thereof, and it is therefore desired that the present embodiment be considered in all respects as illustrative and not restrictive. Any headings utilized within the description are for convenience only and have no legal or limiting effect.

What is claimed is:

1. A utility rack system, comprising:
    a base frame, wherein the base frame includes a central slot, wherein the base frame includes a plurality of cross members and a plurality of apertures spaced along the length of the central slot, the cross members having a rectangular cross section;
    a mounting member extending from the base frame for securing the base frame to a vehicle, wherein the base frame is pivotally secured to the mounting member, the central slot extending in a plane defined by an axis of a towing hitch and rotation of the base frame about the mounting member;
    an adjustment member positioned within and extending parallel to an axis of the central slot for locking the base frame in a horizontal position, a vertical position, and various positions between the horizontal position and the vertical position by coupling to a corresponding aperture of the plurality of apertures; and
    a first attachment removably secured to one or more of the plurality of cross members by a connector member, the connector member configured to contact cross member on at least two opposing sides of rectangular cross section.

2. The utility rack system of claim 1, wherein the first attachment is comprised of a tray attachment.

3. The utility rack system of claim 1, wherein the first attachment is comprised of a storage box.

4. The utility rack system of claim 1, wherein the first attachment is comprised of bike retainers.

5. The utility rack system of claim 1, further comprising a vehicle receiver removably secured to the mounting member.

6. The utility rack system of claim 5, wherein the vehicle receiver is secured to the vehicle.

7. The utility rack system of claim 1, wherein the first attachment is comprised of ski/snowboard retainers.

* * * * *